(12) United States Patent
Thorensen

(10) Patent No.: US 7,484,772 B2
(45) Date of Patent: Feb. 3, 2009

(54) END CONNECTION FOR PIPES AND A METHOD FOR ITS MANUFACTURE

(75) Inventor: Rolf Thorensen, Älvängen (SE)

(73) Assignee: Volvo Lastvagnar AB, Gothenburg (SE)

( * ) Notice: Subject to any disclaimer, the term of this patent is extended or adjusted under 35 U.S.C. 154(b) by 0 days.

(21) Appl. No.: 10/710,219

(22) Filed: Jun. 27, 2004

(65) Prior Publication Data

US 2005/0029811 A1 Feb. 10, 2005

Related U.S. Application Data

(63) Continuation of application No. PCT/SE02/02442, filed on Dec. 20, 2002, now abandoned.

(30) Foreign Application Priority Data

Dec. 27, 2001 (SE) .................................... 0104448

(51) Int. Cl.
*F16L 27/00* (2006.01)
*F16L 27/093* (2006.01)
*F16L 13/14* (2006.01)

(52) U.S. Cl. .................. 285/190; 285/139.2; 285/142.1; 285/382; 29/515; 29/516

(58) Field of Classification Search .................. 285/190, 285/191, 139.2, 142.1, 185, 382, 256, 382.1, 285/382.2; 29/515, 516
See application file for complete search history.

(56) References Cited

U.S. PATENT DOCUMENTS

| | | | | |
|---|---|---|---|---|
| 587,695 | A | * | 8/1897 | Billing et al. ................ 285/114 |
| 1,223,591 | A | * | 4/1917 | Layne .......................... 285/15 |
| 1,678,640 | A | * | 7/1928 | Ward ........................ 285/382.2 |
| 3,068,563 | A | * | 12/1962 | Reverman .................... 29/458 |
| 3,210,102 | A | * | 10/1965 | Joslin .......................... 285/374 |
| 3,689,112 | A | * | 9/1972 | Slator et al. .................... 285/39 |
| 4,310,184 | A | * | 1/1982 | Campbell .................... 285/238 |
| 4,330,924 | A | * | 5/1982 | Kushner et al. ............... 29/458 |
| 4,679,829 | A | * | 7/1987 | Yanagisawa ................. 285/190 |
| 4,850,621 | A | * | 7/1989 | Umehara ..................... 285/322 |
| 4,902,048 | A | * | 2/1990 | Washizu ...................... 285/319 |
| 5,044,671 | A | * | 9/1991 | Chisnell et al. ................ 285/55 |

(Continued)

FOREIGN PATENT DOCUMENTS

DE 1475640 A 3/1969

(Continued)

*Primary Examiner*—James M Hewitt
(74) *Attorney, Agent, or Firm*—Novak Druce + Quigg LLP

(57) ABSTRACT

Method and arrangement for providing an end connection for pipes made from a rigid, but deformable material. An end connection includes a pipe casing (1) that protrudes into a pipe end (15). The pipe casing has an outer mantle surface extending symmetrically around a longitudinal axis (9), to yield a surface (2) of substantially circular cross section having a diameter allowing the pipe end to be applied over the pipe casing. The mantle surface has two recessed parts (3, 4) running peripherally therearound to receive embossed parts (24, 25) of the pipe end (15) for rotational movement between the pipe end and the pipe casing (1). A sealing member (13), between the recessed parts (3, 4), seals a portion of the space between the outer mantle surface and the pipe end.

6 Claims, 4 Drawing Sheets

U.S. PATENT DOCUMENTS

| | | | | |
|---|---|---|---|---|
| 5,072,655 A | * | 12/1991 | Adler | 92/160 |
| 5,890,287 A | * | 4/1999 | Fukaya | 29/890.14 |
| 5,992,898 A | * | 11/1999 | Saylor | 285/55 |
| 6,059,338 A | | 5/2000 | Diederichs | |
| 6,082,784 A | * | 7/2000 | Fukaya | 285/382 |
| 6,099,045 A | * | 8/2000 | Pirona | 285/256 |
| 6,474,701 B1 | * | 11/2002 | Bowles et al. | 285/382.1 |
| 6,481,764 B1 | * | 11/2002 | Kwok | 285/382 |

FOREIGN PATENT DOCUMENTS

| | | | |
|---|---|---|---|
| DE | 19507688 A1 | | 9/1996 |
| FR | 2 675 880 A1 | * | 10/1992 |
| GB | 2 254 389 A | * | 10/1992 |
| SE | 9101420 A | | 11/1991 |
| WO | WO 97/41377 | * | 11/1997 |
| WO | WO 99/06748 A1 | * | 2/1999 |
| WO | WO 03/ 056226 A1 | * | 7/2003 |

* cited by examiner

END CONNECTION FOR PIPES AND A METHOD FOR ITS MANUFACTURE

CROSS-REFERENCE TO RELATED APPLICATIONS

The present application is a continuation patent application of International Application No. PCT/SE02/02442 filed 20 Dec. 2002 which was published in English pursuant to Article 21(2) of the Patent Cooperation Treaty, and which claims priority to Swedish Application No. 0104448-6 filed 27 Dec. 2001. Said applications are expressly incorporated herein by reference in their entireties.

TECHNICAL FIELD

The present invention relates to an arrangement and method for connecting the ends of pipes made from a rigid, but deformable material. A connection formed between pipe ends, also referred to herein as an end connection, includes a pipe end over a pipe casing that protrudes into the pipe end. The pipe casing also comprises a relatively rigid material that is rotationally symmetric along a longitudinal axis thereof and has an outer mantle or surface, referred to herein as a mantle surface, having a diameter that is adapted to the inner diameter of the pipe end allowing the pipe end to fit over the pipe casing. The mantle surface is equipped with at least two recessed parts forming channels that run peripherally around the mantle surface to receive embossed parts formed in the pipe end for alignment with the recessed parts during formation of an end connection. At least one sealing member ensures sealing between the pipe casing and pipe end. The invention also relates to a method for manufacturing such an end connection for pipes.

BACKGROUND ART

From U.S. Pat. No. 6,059,338, it is previously known to arrange a pipe connection in the form of a tubular casing that is inserted in one end of a pipe. The pipe casing is formed with countersinks in which embossings are carried. A sealing element is arranged between the pipe casing and the pipe end. In order to obtain complete sealing, the sealing element has to be compressed, thus rendering the friction between the sealing element and the pipe casing on one hand, and the pipe end on the other hand so high that any relative rotation between the pipe casing and the pipe end normally is not possible.

For certain types of connections, the connection must be made in a predetermined rotational position of the connection relative to, for example, a fixed part in a pipe system. At conventional pipe connections, for example hydraulic systems, the pipe end and the pipe casing inserted therein are in many cases firmly connected with each other by means of soldering. Thus the pipe casing must be connected to the pipe end with a predetermined rotational angle, which requires special fixtures for final assembly of the end connection.

DISCLOSURE OF INVENTION

The purpose of the present invention is to present an end connection which requires no fixed rotational angle between the parts during assembly of the end connection.

BRIEF DESCRIPTION OF THE DRAWINGS

The invention shall in the following be described more in detail with a number of exemplary embodiments with reference to the appended drawings, wherein.

MODE FOR THE INVENTION

Figure 1:
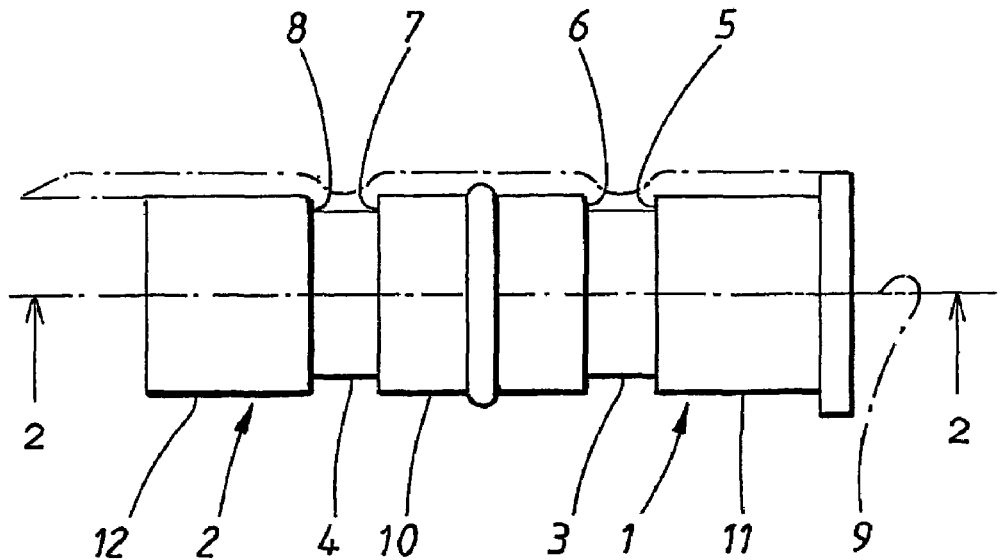
FIG. 1 is a side elevational view of a part of an end connection configured as a first embodiment according to the teachings of the present invention.
Figure 2:
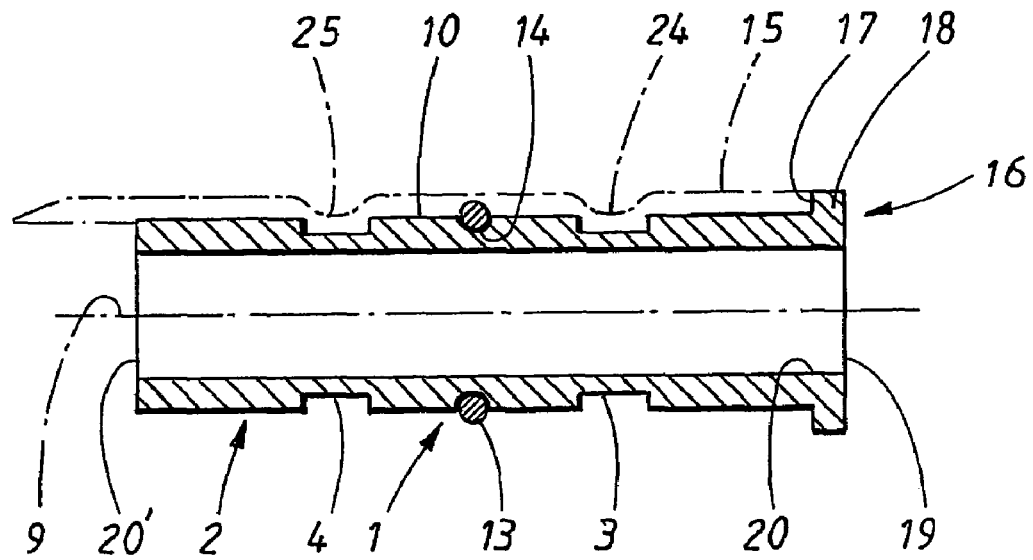
FIG. 2 is a partial cross-sectional, partial cutaway view showing a longitudinal section through the end connection of FIG. 1 taken along line 2-2 in FIG. 1.

The end connection according to the invention shall first be described with respect to a first embodiment with reference to FIGS. 1 and 2. The end connection comprises (includes, but is not limited to) a pipe casing 1 that is mainly cylindrical and that is equipped with a mantle surface 2. In the mantle surface, recessed parts 3, 4 are arranged; in the illustrated example, these parts 3, 4 number two, and are also cylindrical and equipped with abrupt transitions in the form of step edges 5, 6, 7, 8. These are, in the first example, shown laterally with respect to the longitudinal axis 9 of the pipe casing, and each one extends in its radial plane. Alternatively, the step edges 5-8 may be inclined; i.e., conically as may be seen in the examples of FIGS. 3-6, and may even meet in pairs in a common tip thus rendering the recessed parts a V-shaped cross sectional form.

An example of another cross sectional form is U-form. The recesses are placed at a distance from each other, enabling an intermediate part 10 to form therebetween, and which is cylindrical and thus is a part of the outer mantle surface 2 of the pipe casing. The mantle surface 2 will thus be divided into an intermediate part 10 and two outer parts 11, 12 of the mantle surface. In the example shown, the intermediate part is relatively symmetrically oriented along the length of the pipe casing 1 such that the outer parts 11, 12 are mainly of the same size. The three parts essentially have the same proportions; that is, the recesses 3, 4 divide the three parts of the mantle surface 2 into portions which are mainly the same size. In the example shown, there is a slightly longer intermediate part. In the illustration, the recesses have the same mutual width and depth, and fall considerably below the axial length of the intermediate part. Each recess 3, 4 has a width that falls below half the axial length of the intermediate part; in the example, mainly a third of its length. The depth of the recesses is limited by the wall thickness of the pipe casing, and in the example, is shown having a magnitude of approximately half the wall thickness.

Around the periphery of the intermediate part 10, one or more sealing elements 13 extend. The sealing elements 13 are made of an elastic, deformable material, such as a polymer or rubber. In the example shown, one sealing element 13 is used and centered symmetrically; i.e., in the middle of the mantle surface of the intermediate part 10, and more precisely in a groove 14 which is formed to receive a part of the sealing element, for example, half of its cross-sectional dimension. In the example shown, the sealing ring is an O-ring with a circular cross-sectional shape and the groove preferably has the cross-sectional form of a semicircle with the same diameter as the undeformed sealing ring. The sealing element may have other forms, for example rectangular, oval, and/or triangular cross sectional form and in which the groove 14 has a form and dimensions which are adapted to the cross sectional form and dimensions of the sealing element.

More sealing elements may be arranged side-by-side at a suitable distance distributed over the length of the intermediate part, not, however, in the immediate vicinity of the recessed parts 3, 4. In FIGS. 1 and 2, the sealing element 13 is shown in an undeformed condition; i.e., before the pipe casing 1 is inserted into a pipe end. The fact is that an end part 15 of a pipe is included in the end connection, which end part 15 in FIGS. 1 and 2 is only indicated schematically with dotted lines on one of the sides of the pipe casing. In order to ensure a correct position between the pipe casing and the end part 15, the pipe casing is formed with a ring-shaped stop edge 17 and its outer end 16, which stop edge 17 in the first and second embodiment is a part of a ring-shaped flange 18 that surrounds the outer, or front opening 19 of the pipe casing. Internally, the pipe casing is equipped with a cylindrical lead-through 20 which extends from the back or inner opening 20' of the casing to the outer opening 19.

Figure 3:
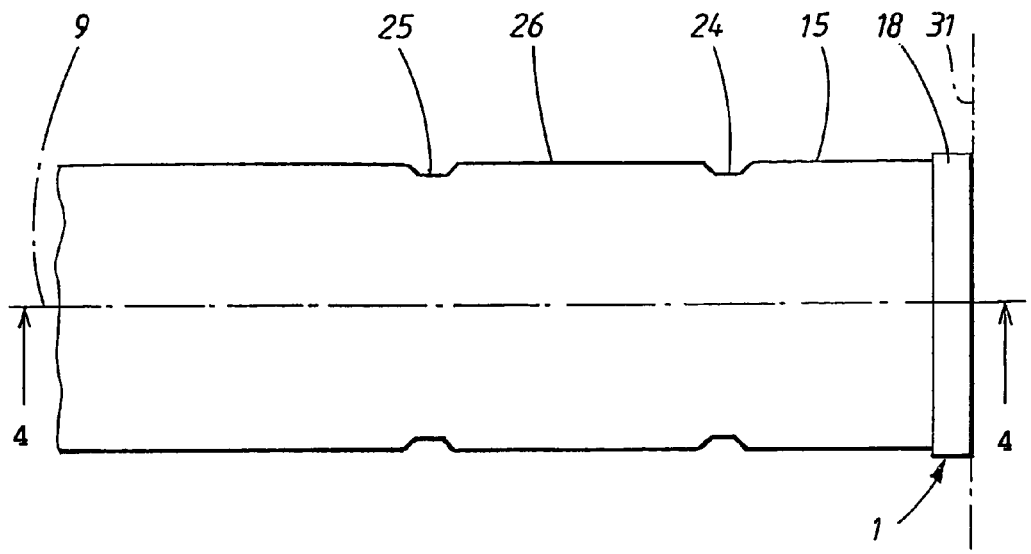
FIG. 3 is a side elevational view of a finished end connection in a somewhat modified form of the first embodiment.
Figure 4:
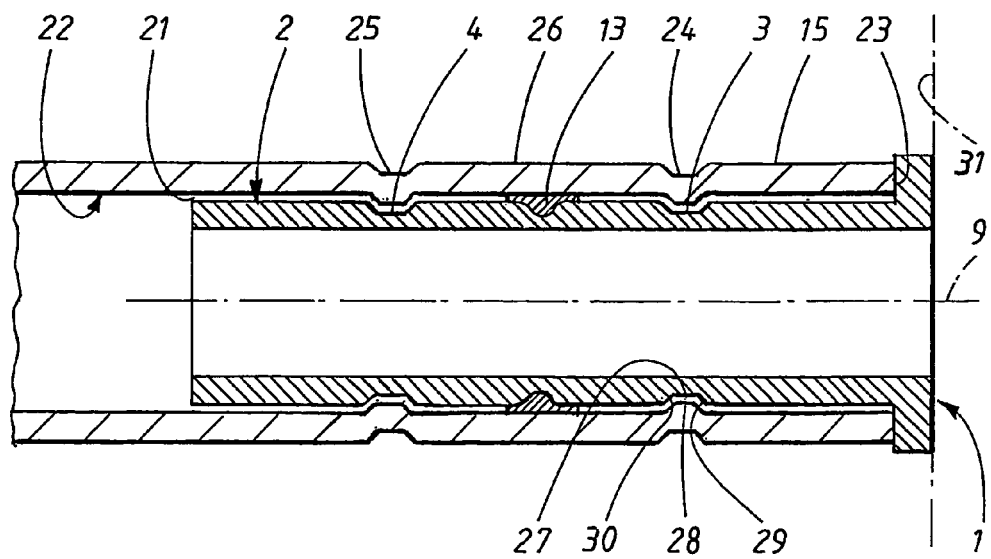
FIG. 4 is a longitudinal cross-sectional view taken along the line 4-4 in FIG. 3.

In FIGS. 3 and 4, a complete end connection is configured according to the invention, but in a second, somewhat modified embodiment that externally has the same appearance as the first embodiment. The pipe casing 1 also has the same main construction with the recesses having been given a lesser width, and the step edges 5-8 have been made less abrupt and form incline conical step surfaces. The width of the recesses; i.e., the axial dimension is, however, preferably greater than their depth; that is, the radial dimension. Further, the outer diameter of the pipe casing is dimensioned to establish a ring-shaped inter-space or gap space 21 between the mantle surface 2 and the cylindrical inner wall 22 of the pipe end after formation of the end connection. In this condition, it is further apparent from FIG. 4 that the sealing element 13 deforms to a great extent, becoming flattened at the inner wall 22 of the pipe end, and spreading axially in the inter-space 21 described previously.

The pipe casing 1 is inserted in the pipe end 15 such that the ring-shaped front surface 23 of the pipe end is in contact with the stop edge 17 of the pipe casing. According to the invention, the pipe end is equipped with embossings 24, 25 for alignment with the recessed parts 3, 4 of the pipe casing following formation of the end connection. The embossings are of such character that they mainly cause a radial displacement of the material in the pipe wall; that is, an embossing of the outer mantle wall 26 of the pipe end results in a corresponding embossing of the inner wall 22 of the pipe end. The embossing is chosen with such a radial depth that the embossed surface 28 inside the pipe end 15 lies at a distance from the longitudinal axis 9 that is less than the outer diameter of the pipe casing. When alignment occurs between the embossings 24, 25 of the pipe end 15 and the recesses 3, 4 of the pipe casing the embossed surface 28 protrudes into the recessed part 3 leaving a slight space between the embossed surface and the bottom surface 27 of the recessed part 3 as shown in FIG. 4.This means that the embossings 24, 25 are received in the recessed parts 3, 4 causing movement of the pipe end 15 to be axially restricted relative to the pipe casing within minor tolerances.

In practice, the embossings may be allowed to "touch bottom;" i.e., they make contact with their inside embossed surface 28 against the bottom surface 27 of the recesses 3, 4 or some of the edge surfaces 29, 30. The contact pressure; i.e. any applied clamping force, shall, however, be evenly distributed between the sealing element 13 and its bearing surfaces of the inner wall 22 of the pipe end and the mantle surface 2 of the pipe casing. A relative rotational movement is possible between the pipe end 15 and pipe casing 1 when a torque applied on the pipe end exceeds a certain value. This value may for example be a selected torque due to a pretension applied to the relatively rigid pipe end 15 such that the pipe end 15 rotates about the pipe casing that has the ring shaped flange 18 fixedly mounted to an immovable part 31, for example the wall of a machine part.

Figure 5:
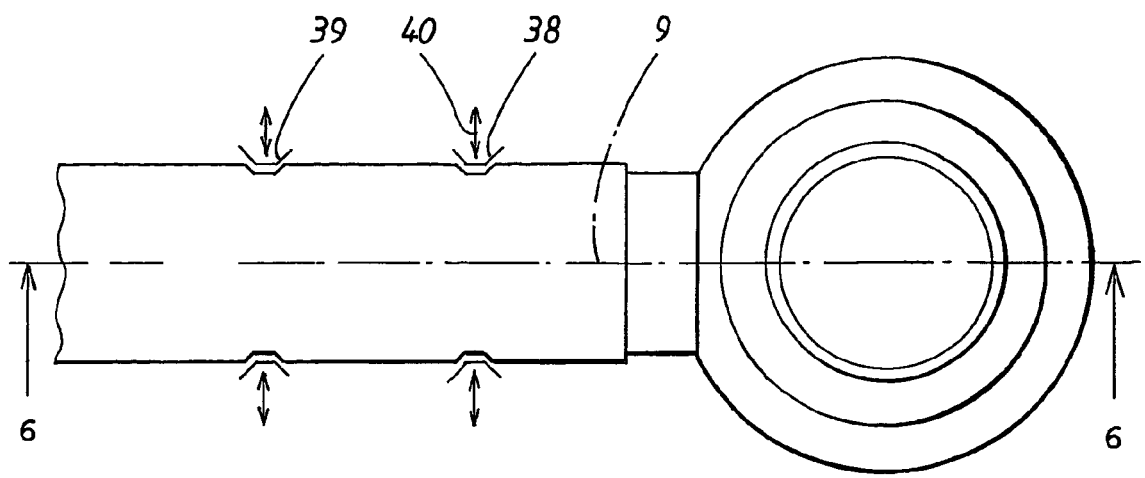
FIG. 5 is a plan view of a third embodiment of a finished end connection.
Figure 6:
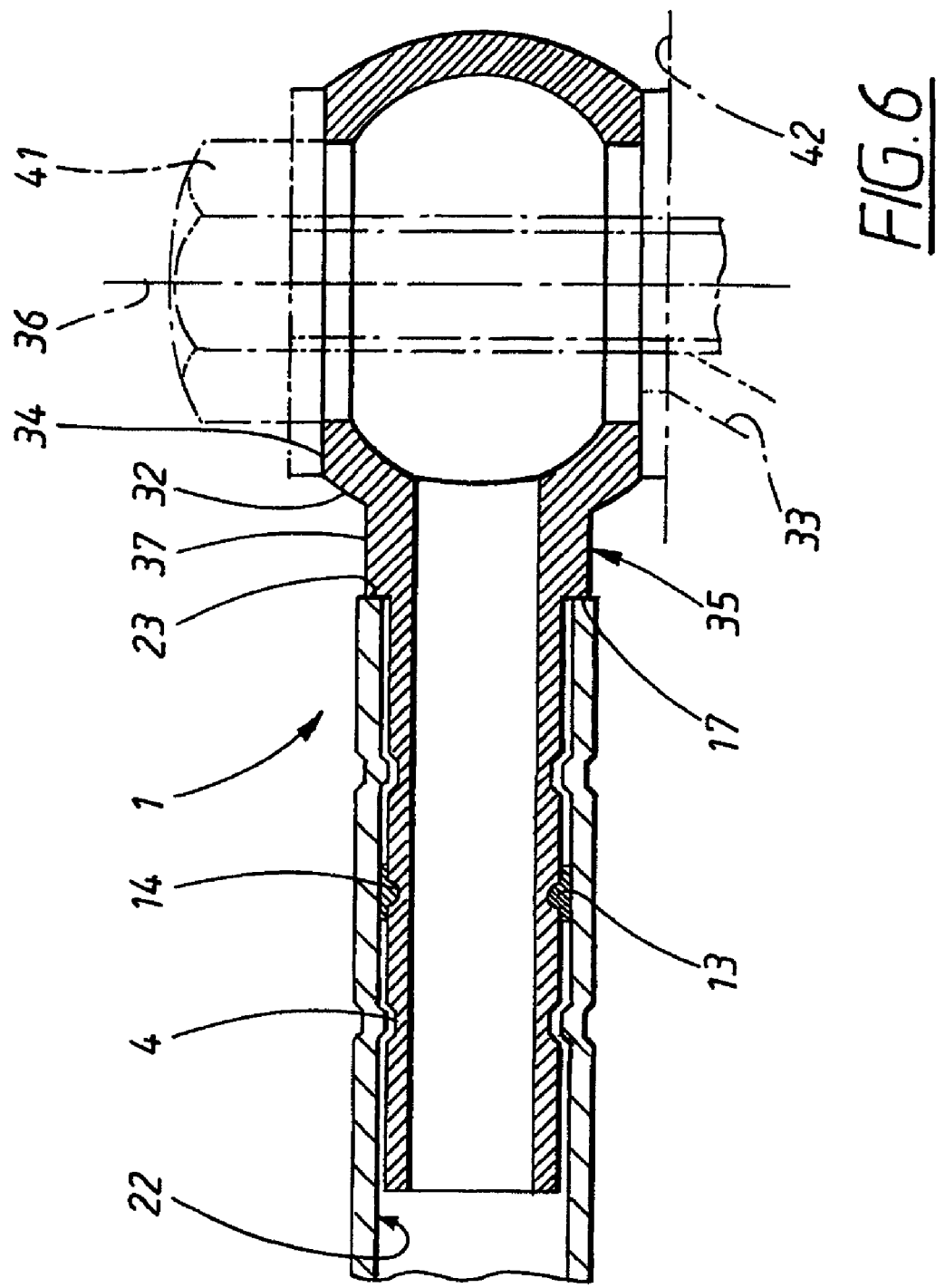
FIG. 6 is a longitudinal cross-sectional view taken along the line 6-6 in FIG. 5.

In FIGS. 5 and 6, a further embodiment is shown which completely corresponds to the embodiment of FIGS. 3 and 4 regarding the clamping technique, but in which the pipe casing 1 outside the pipe end 15 is formed in another way, and that is a so-called banjo-type nipple 32. This is intended for connection to a fixed fluid channel 33 which is indicated with dashed and dotted lines. The banjo-type nipple is formed with two parallel main connection surfaces 34, 35 for connection against the fixed orifice of the channel and enables adjustment of the nipple in a predetermined rotational position along the longitudinal axis 36 to a fastening screw 41, indicated in FIG. 6 with a dashed and dotted line. The fastening screw 41 is screwed into a fixed part 42 with an intermediate sealing washer. The connection communicates with the fixed channel 33 through one of the openings of the nipple, while the opposite opening is sealed by means of the screw head and a washer. Thus, a predetermined direction of the longitudinal axis 9 of the end connection which is suitable for the mounting is chosen, while that of the banjo-type nipple; i.e., the rotational position of the pipe casing 1 along its longitudinal axis 9, is determined by the surfaces 34, 35 of the banjo-type nipple—their connection planes.

By means of the end connection configured according to the invention, the pipe casing 1 may thus be turned to a rotational movement which is adapted for the mounting along its longitudinal axis 9 as the pipe end 15 may be turned around the longitudinal axis 9 by means of the turnable axially mainly locked connection between the pipe end and the pipe casing. The front surface 23 of the pipe end, in the example according to FIGS. 5 and 6 axially controlled in one of the directions as the banjo-type nipple is equipped with a thicker part 37 outside the pipe end and which by means of the step 17 transcends to the pipe casing with a main diameter that somewhat falls below the diameter of the inner wall 22 of the pipe end.

The manufacture of exemplary embodiments of the end connection according to the invention described above will be further summarized below. As described previously, the pipe casing 1 is made from a relatively hard material, preferably a metal which is relatively hard to deform, for example galvanized steel, or some alloy thereof. The pipe casing includes its recessed parts 3, 4 and the groove 14 for the sealing element 13. Methods such as turning or milling may be used to machine these features 3, 4, 14 in the wall of the pipe casing. The sealing element is applied on the pipe casing and placed in its groove. Thereafter, the pipe end 15 is applied on the pipe casing 1. The pipe end is part of a fluid pipe, for example a hydraulic pipe or compressed air pipe, which for example has, at its opposite end, a fixed connection that resists twisting motion. The pipe end and the associated pipe are, for example, made in a somewhat softer, more easy to deform material that mainly provides a plastically remaining deformation such as copper, aluminum or some other suitable alloy thereof. In other words, the material used for the pipe end is preferably softer than the material used for the pipe casing. In a non-limiting example, the pipe casing could be made from steel or a steel alloy for use with a pipe end made from copper that is more deformable than steel and retains its deformability after formation of the end connection. The pipe end is applied until its front end comes into contact with the stop edge 17 of the pipe casing 1. Then, following formation of the end connection, the relative axial position of the pipe end and the pipe casing coincides with the longitudinal axis of the end connection.

Thus, the free end of the pipe casing, for example the banjo-type nipple, is retained in a fixture or another retainer which retains the pipe casing. In fixed positions relative to the fixture, clamping devices 38, 39 are arranged which have a clamping part that is schematically indicated in FIG. 5. The number of sets of clamping devices may be the same as the number of recesses 3, 4; i.e., two for the example shown in FIG. 5, or be a clamping tool that in one sequence performs the work to form embossed portions in the wall of the pipe end to be received in each recessed part. The clamping devices may be arranged such as springing rings which are allowed to be brought radially inwards in the direction towards the longitudinal axis 9 a distance such that the permanent embossings 24, 25 are arranged in the pipe end such that they at least somewhat protrude into the recessed parts 3, 4. After the procedure has been performed, the clamping devices are brought back radially outwards as indicated by the direction of the double arrows 40. The embossings may be continuous and extend in a ring-shaped manner around the whole periphery of the pipe end or be local embossings at least three and uniformly distributed over the periphery. The recessed parts must, however, be ring-shaped to enable the relative rotational movement. Between the pipe casing and the pipe end.

The pipe, and thereby the pipe end 15 are thus originally not a specially made part in contrast to a pipe-shaped coupling part or nipple, but the pipe end is formed by means of cutting off a continuous pipe to a desired length, which pipe is homogeneous and mainly has inner and outer surfaces conforming to the profile of a cylinder that is substantially uniform along its length.

The invention claimed is:

1. A pipe assembly, comprising:
   a pipe made of rigid material; and
   a pipe casing made of rigid material and extending into an end of the pipe;
   wherein the pipe casing has an exterior mantle surface with at least two recessed portions of reduced diameter extending circumferentially around the pipe casing; and
   wherein the pipe has embossed portions extending radially inwardly into the recessed portions of the pipe casing so as to limit relative longitudinal movement of the pipe and the pipe casing while permitting relative rotational movement of the pipe and the pipe casing;
   said pipe assembly further comprising a sealing member disposed between a radially inner surface of the pipe and the mantle surface of the pipe casing and extending circumferentially around the pipe casing, the sealing member being seated within a groove that is formed in the mantle surface of the pipe casing, between two of said at least two recessed portions, such that the exterior surface of the pipe is free of radially outward protrusions at the axial position of the sealing member.

2. The assembly of claim 1, wherein said the pipe casing includes a widened portion at an end thereof, which widened portion forms an axial end-stop for the end of the pipe.

3. The assembly of claim 2, wherein the widened portion is part of a banjo-type nipple.

4. The assembly of claim 2, wherein the widened portion is part of a threaded part that enables connection to a corresponding threaded, fixed part by means of the assembly.

5. The assembly of claim 1, wherein the embossed portions of the pipe extending radially inwardly into the recessed portions of the pipe casing prevent relative longitudinal movement of the pipe and the pipe casing.

6. A method of forming a pipe assembly, comprising:
   providing a pipe made of rigid material and having a smooth exterior surface;
   providing a pipe casing made of rigid material and having an exterior mantle surface with at least two recessed portions of reduced diameter extending circumferentially around the pipe casing, the pipe casing further having a groove that is formed in the mantle surface between two of said at least two recessed portions;
   disposing a sealing member in the groove such that the sealing member extends circumferentially around the pipe casing;
   inserting the pipe casing into an end of the pipe; and
   clamping the pipe at at least two axial positions so as to form embossed portions that extend radially inwardly into the recessed portions of the pipe casing while leaving the exterior surface of the pipe free of radially outward protrusions at the axial position of the sealing member so as to limit relative longitudinal movement of the pipe and the pipe casing while permitting relative rotational movement of the pipe and the pipe casing.

* * * * *